United States Patent [19]

Abernethy

[11] Patent Number: 4,736,073
[45] Date of Patent: Apr. 5, 1988

[54] NOISE-CANCELING SYSTEM FOR A DIGITIZING TABLET

[75] Inventor: Brian L. Abernethy, Glendale, Ariz.

[73] Assignee: Sanders Associates, Inc., Nashua, N.H.

[21] Appl. No.: 828,060

[22] Filed: Feb. 10, 1986

[51] Int. Cl.⁴ ............................................. G08C 21/00
[52] U.S. Cl. .................................................. 178/19
[58] Field of Search .................... 178/19, 18; 324/207, 324/208; 340/706, 709

[56] References Cited

U.S. PATENT DOCUMENTS 4,507,523  3/1985  Gohara et al. ................... 178/19

Primary Examiner—Stafford D. Schreyer
Attorney, Agent, or Firm—Cesari and McKenna

[57] ABSTRACT

A digitizing tablet (10) has common return lines (24, 25, 26, and 27) that tend to suppress sensing of the spurious signals induced in them when the digitizer probe (12) approaches the edge of a digitizing area (14). Each return line includes a connection segment (36) and a compensation segment (40), which extend in antiparallel along the edge of the digitizing area (14). The compensation segment (40) is spaced farther from the digitizing area than the connection segment (36) is so that it is only half as sensitive as the connection segment to probe signals. However, since only half of the emf induced in the connection segment (36) is coupled to the circuitry (22) for processing the induced signals, the signals induced in the return lines tend to cancel.

12 Claims, 2 Drawing Sheets

NOISE-CANCELING SYSTEM FOR A DIGITIZING TABLET

BACKGROUND OF THE INVENTION

The present invention is directed to digitizer tablets and particularly to the sensing circuits employed by such tablets.

A digitizer tablet is a device that provides an indication of the position of a probe with respect to a digitizing surface. One type of digitizer tablet includes sets of parallel array conductors, one set oriented perpendicular to the other. The probe is driven to cause an oscillating magnetic field, which induces signals in the array conductors. The signals on the array conductors are sensed individually and compared to determine the position of probe. Typically, if two adjacent wires in a set have opposite-phase signals on them, the processing circuitry concludes that the probe is located between those wires. By taking the same approach with the other set, the digitizer locates the probes in two dimensions.

Other types of digitizing tablets operate in the reciprocal manner, driving the conductors and sensing with the probes, but they otherwise operate in the same fashion. Some others sense electrostatic signals rather than magnetic signals and thus may thus use a different method to identify the array conductors to which the probe is closest. In all of these methods, however, it is necessary in order to obtain further resolution to compare the amplitudes of the signals on the two closest array conductors. Typically, a ratio is taken for this purpose.

A problem that arises in such digitizing tablets is that they are subject to inaccuracies due to edge effects. Accurate position determination depends on the relative amplitudes of the signals induced in the array conductors. Toward the middle of the digitizing surface, the relative amplitudes of the signals on the two highest-amplitude wires is a relatively accurate indication of the position of the probe. This is because the probe induces substantial signals in only the parallel array conductors. When the probe approaches the edge of the tablet, however, it induces signals not only in the parallel array conductors but also in return lines, and this can lead to inaccuracies.

An object of the present invention is to reduce the errors that result when the probe approaches the edge of the tablet's digitizing surface.

SUMMARY OF THE INVENTION

The foregoing and related objects are achieved in a digitizing tablet in which the common return lines that run along the edge of the tablet are doubled back so that each return line has a connection segment, to which the array conductors are connected, and a compensation segment, which runs antiparallel to the connection segment. Since the two segments are antiparallel, the signals induced in them are opposite and tend to cancel. In the connection segment, however, the signals induced on part of its length do not contribute to the signal received by the processing circuitry, while the entire compensation segment makes a contribution. To cause the contributions from the two segments more nearly to cancel, the compensation segment is spaced farther from the edge of the digitizing area than the connection segment is so that it is roughly half as sensitive to signals induced by a probe at the edge of the digitizing area.

BRIEF DESCRIPTION OF THE DRAWINGS

These and further features and advantages of the present invention are described in connection with the accompanyiny drawings, in which.

DETAILED DESCRIPTION OF THE PREFERRED EMBODIMENTS

Figure 1:
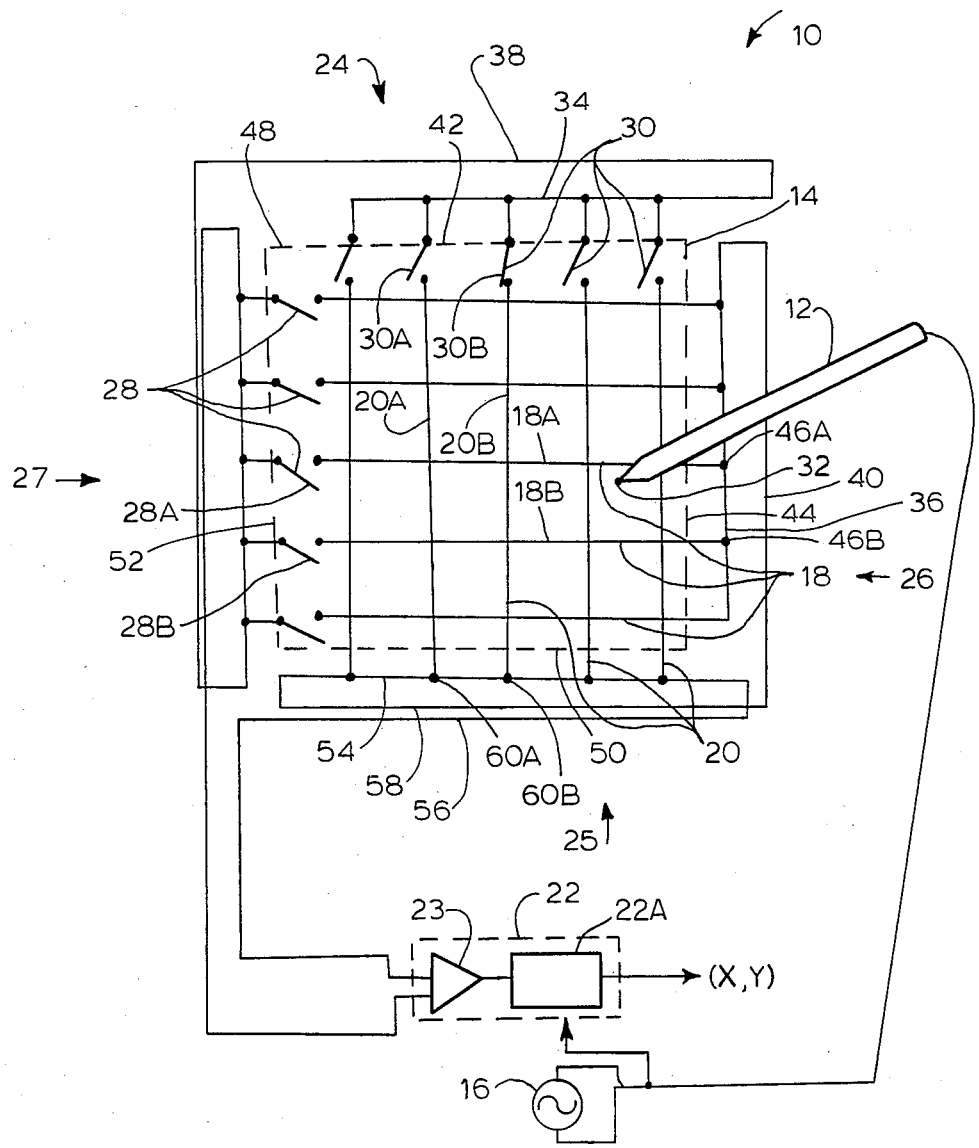
FIG. 1 is a schematic diagram of one embodiment of the present invention.

FIG. 1 depicts in schematic form a digitizing tablet 10 that incorporates the teachings of the present invention. The purpose of the digitizing tablet is to generate signals representing the position (x,y) of a probe 12 within a digitizing area 14. A signal source 16 drives a coil in the probe 12 with a source signal consisting of an oscillating current so that the probe 12 generates a probe signal consisting of a varying magnetic field. The varying field induces electromotive force in a first set of parallel conductors 18 and in a second set of parallel array conductors 20 oriented at right angles to the array conductors of the first set.

Return circuitry is provided for connecting the array conductors 18 and 20 to processing circuitry 22 so that a differential amplifier 23 included in the processing circuitry 22 can amplify the signals induced in those conductors and apply the amplified signal to the remainder 22a of the processing circuit 22. It will be convenient to think of this return circuitry as including first, second, third, and fourth return lines 24, 25, 26, and 27, although the first and fourth return lines 24 and 27 are connected in series to form a single composite return line, and second and third return lines 25 and 26 form another composite return line. Array conductors 20 extend between the first and second return lines 24 and 25, and array conductors 18 extend between the third and fourth return lines 26 and 27. Together, the first and fourth return lines 24 and 27 connect one end of each of the array conductors 18 and 20 to one input terminal of the differential amplifier 23, while the second and third return lines together connect the other end of each of the array conductors 18 and 20 to the other input terminal of the differential amplifier 23.

This arrangement results in a plurality of parallel sense paths leading from one amplifier input terminal to the other. Each sense path includes the first and fourth return lines 24 and 27, a single one of the array conductors 18 or 20, and the second and third return lines 25 and 26. So that only one of these parallel sense paths is completed at a time, a switching circuit is provided that includes a switch 28 interposed in each array conductor 18 and a switch 30 interposed in each array conductor 20. The processing circuit 22 operates the switching circuitry (by means of connections omitted from FIG. 1 for the sake of clarity) to cause it to close only one of the switches 28 or 30 at a time. Therefore, the signal that the differential amplifier 22 receives at any one time includes a contribution from the electromotive force induced in only one array conductor 18 or 20.

The processing circuit 22 receives signals from each of the sense paths in sequence and, by reference to the output of the signal source 16, compares their phases. When it finds approximately a 180° phase shift between the signals from adjacent ones of the array conductors 18 or 20, it concludes that the probe is positioned between those two conductors. Further resolution is obtained by taking the ratio between the amplitudes of the signals on the two adjacent array conductors.

This method of obtaining further resolution is quite accurate toward the center of the digitizing area 14. However, the accuracy is affected by edge effects when the probe 12 is in a position, such as position 32, which is near an edge of the digitizing area 14. The manner in which the arrangement of the return circuit of the present invention reduces such inaccuracies will be discussed after a digression in which a digitizing tablet is described that operates in a manner reciprocal to that in which the tablet 10 of FIG. 1 does.

Figure 2:
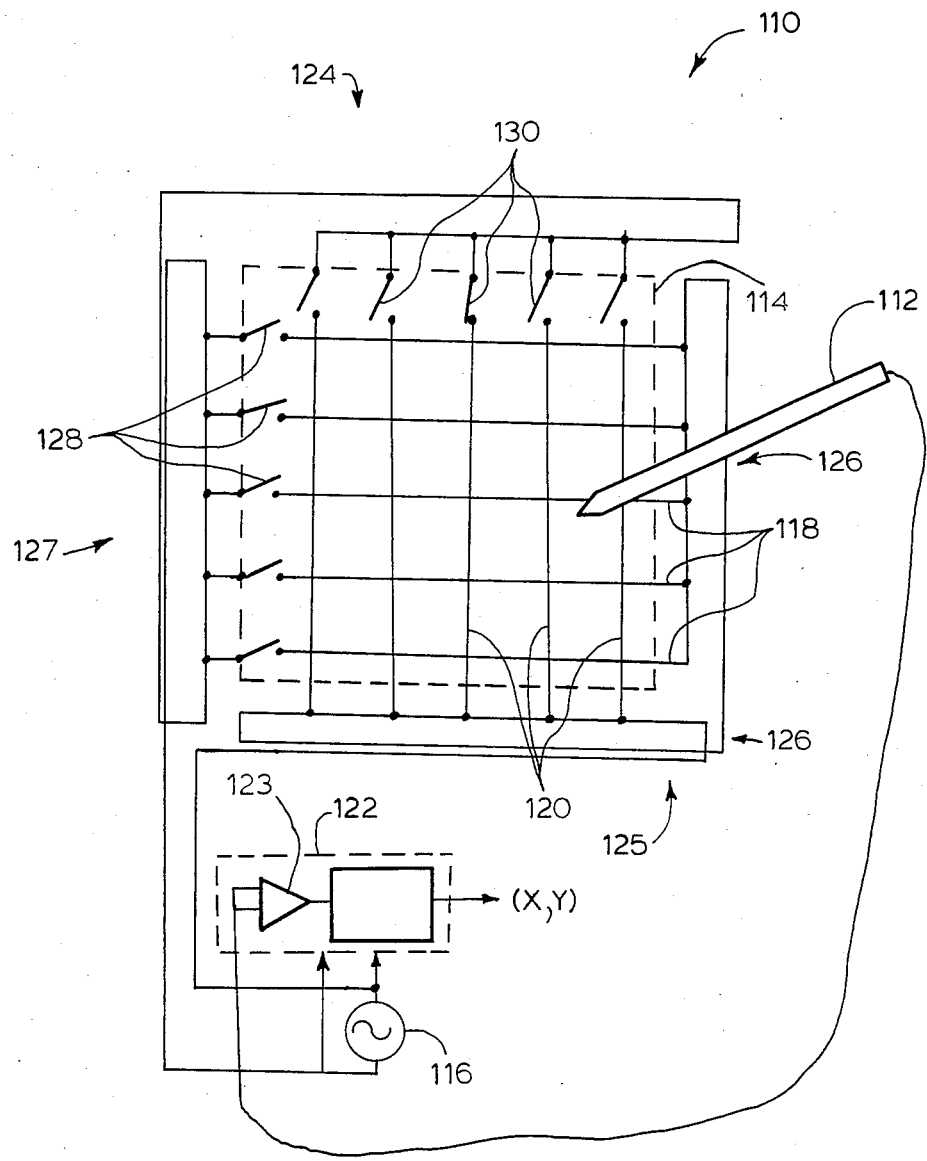
FIG. 2 is a schematic diagram af another embodiment of the present invention.

FIG. 2 depicts an alternate type of tablet 110 in schematic form. Like the tablet 10 of FIG. 1, the tablet 110 of FIG. 2 determines the position of a a probe 112 with respect to a digitizing area 114. In tablet 110, however, the signal source 116 drives array conductors 118 and 120 rather than the probe 112. The processing circuit 122 still includes a differential amplifier 123, but the input to that amplifier is the signal induced in the probe 112 by currents in the array conductors 118 and 120. The array conductors 118 and 120 receive the source signals from the signal source 116 by way of a drive circuit that includes first, second, third, and fourth drive lines 124, 125, 126, and 127, which follow paths identical to those followed by return lines 24, 25, 26, and 27 of digitizing tablet 10.

This arrangement results in a plurality of parallel drive paths leading from one amplifier input terminal to the other. Each drive path includes the first and fourth drive lines 124 and 127, a single one of the array conductors 118 or 120, and the second and third drive lines 125 and 126. So that only one of these parallel drive paths is completed at a time, a switching circuit is provided that includes a switch 128 interposed in each array conductor 118 and a switch 130 interposed in each array conductor 120. The processing circuit 122 operates the switching circuitry (by means of connections omitted from FIG. 2 for the sake of clarity) to cause it to close only one of the switches 128 or 130 at a time. Therefore, the signal that the differential amplifier 123 receives at any one time includes a contribution from the electromotive force induced in the probe 112 by only one array conductor 118 or 120.

The processing circuit 122 receives signals induced in the probe 112 by each of the drive paths in sequence and, by reference to the output of the signal source 116, compares their phases. When it finds approximately a 180° phase shift between the signals induced in the probe 112 by adjacent ones of array conductors 118 or 120, it concludes that the probe 112 is positioned between those two conductors. Further resolution is obtained by taking the ratio between the amplitudes of the signals induced by the two adjacent array conductors. By reciprocity, it can be seen that this method of obtaining further resolution is affected by the same edge effects when practiced in connection with tablet 110 as it is when practiced in connection with tablet 10. The manner in which the arrangement of the drive circuit reduces such inaccuracies will be described by reference to its reciprocal, the return circuit of FIG. 1.

FIG. 1 shows that the first and third return lines 24 and 26 include connection segments 34 and 36, respectively, to which one end of each of the array conductors is connected, as well as compensation segments 38 and 40, which run substantially parallel to the connection segments 34 and 36 but are spaced from the edges 42 and 44 of the digitizing area by a greater distance so that probe signals from the probe 12 when it is in position 32 cause about half the signal amplitude per unit length in the connection segment 36 as they do in segment 40. This reduced sensitivity adds to the tendency for the signals induced in the connection and return segments 36 and 40 to cancel. The reason for this can be understood when one considers what happens when the probe 12 is in position 32.

When the probe 12 is in position 32, the switches are operated in succession, and the processing circuitry 22 observes a phase reversal between the signal that it receives when switch 28a is closed and the signal that it receives when switch 28b is closed. Accordingly, it concludes that the probe 12 is between array conductors 18a and 18b. The only amplitudes with which it is concerned are therefore those of the signals that result from closing switches 28a and 28b, but these signals have significant components not only from the electromotive forces induced in line 18a or 18b but also from the electromotive forces induced in the connection and compensation segments 36 and 40.

However, although the electromotive force induced throughout the entire length of the compensation segment 40 contributes to the signal sent to the processing circuitry 22, only half the electromotive force induced in the connection segment 36 contributes to that signal. This is because the sense path is completed through only the part of the connection segment 36 above the connection point 46a or 46b at which the connection segment 36 is connected to the conductor 18a or 18b whose switch 28a or 28b is closed. Although only five array conductors 18 are shown in one set in FIG. 1, there are typically a large number of them, and the distance between them is very small in comparison with the distance from digitizing-area edge 44 to connection segment 36. In addition, all appreciable electromotive force is induced in the connection segment fairly close to the connection points associated with the array conductors to which the probe 12 is closest. Therefore, the total electromotive force induced in the part of the connection segment 36 below the connection point 46a or 46b is very nearly equal to the electromotive force induced on the part above that connection point, so the connection segment 36 contributes to the processing-circuit signal only half the total electromotive force induced on it.

For this reason, the compensation segment 40 is spaced farther from the digitizing-area edge 44 than the connection segment 36 is. Specifically, it is spaced by enough distance so that, when probe 12 is in the part of the digitizing area 14 in which its effect on the return circuit is greatest, the electromotive force induced on the entire compensation segment is half that induced on the entire connection segment. This spacing may be about twice the spacing of the connection segment 36, although it may be a little more to compensate for the elevation of the probe coil above the plane of the return circuit. The result is that, although the processing circuit 22 receives all of the electromotive force induced in the compensation segment 40 but only half that induced in the connection segment 36, the electromotive forces on the two segments still substantially cancel.

Inspection of FIG. 1 reveals that the same result obtains when the probe 12 is positioned near another edge 48 of the digitizing area 14. I will now describe how the same result is afforded when the probe is near one of the other two edges 50 and 52. I will refer particularly to a probe position near edge 50, but it will be apparent that this description applies equally when the probe 14 is positioned near edge 52.

In the vicinity of edge 50, the return circuit includes three conductor segments 54, 56, and 58 in which the probe 12 induces significant electromotive force when it is near that edge. Segments 54 and 56 are connection and compensation segments similar to connection and compensation segments 36 and 40 of return line 26. In addition to these segments, there is an extension segment 58 by which the compensation segment 40 of return line 26 is connected to the connection segment 54 of return line 25. To describe what happens when the probe 12 is positioned near edge 50, it is necessary to consider two situations.

In the first situation, the x position of the probe 12 is being determined, so the important quantity is the ratio of the signal amplitudes produced by closures of two adjacent switches, say, switches 30a and 30b. This is similar to the situation described in connection with edge 44 and connection and compensation segments 36 and 40, and it is thus apparent that no electromotive force is coupled from the part of conection segment 54 to the left of the particular connection point 60a or 60b to which is connected the array conductor 20a or 20b currently being sensed. Since the extension segment 58 is connected to that part of the connection segment 54, the extension segment and all of return line 26 are isolated from the processing circuit 22. These parts of the return circuit can therefore be ignored, and it then becomes apparent that the electromotive forces induced in the connection and compensation segments 54 and 56 cancel in the same way as those induced in connection and compensation segments 36 and 40 do. In the first situation, therefore, return lines 25 and 27 operate in the same way as return lines 24 and 26 do.

In the second situation, the probe is still near edge 50, but the y position is being determined. Therefore, one of switches 28 is closed, and a sense path is completed that includes, say, array conductor 18a as well as part of return line 27 on one side of conductor 18a and, on the other side of connector 18a, part of return line 26 and all of extension segment 58 and return line 25. That is, all of the electromotive force induced in the extension segment 58 and in the return line 25 by the probe 12 is coupled to the processing circuit 22. Because of the arrangement of the respective segments illustrated in the drawings, however, there is still substantial cancellation of the components of electromotive force that these segments contribute to the processing-circuit signal.

The reason for this is that extension segment 58 extends in the same direction through substantially the same path as compensation segment 56 does. Accordingly, the electromotive forces induced on these two segments are equal, and their sum is equal in magnitude but opposite in polarity to the electromotive force induced on the connection segment 54. Therefore, although all of the electromotive force induced on the connection segment 54 is coupled to the processing circuit in this situation, as opposed to only half in the previous situation, it still is substantially canceled out.

Similar cancellation occurs in return line 27 when the probe 12 is in the vicinity of edge 52.

Although this invention has been described in connection with specific examples, it is apparent from the foregoing description that it can be practiced in a wide range of embodiments. It can even be applied, for instance, to electrostatic digitizers as well as to electromagnetic ones. The present invention thus constitutes a significant advance in the art.

What is claimed as new and desired to be secured by Letters Patent of the United States is:

1. A digitizing tablet comprising:
   A. processing circuitry, adapted to receive array-conductor signals from array conductors having a predetermined spatial relationship, for generating, from array-conductor signals received thereby, a position indication representing the position of a digitizer probe that induces the array-conductor signals;
   B. a set of array conductors extending substantially parallel to each other throughout a digitizing area;
   C. a digitizing probe for generating a probe signal that induces array-conductor signals in array conductors near the probe;
   D. a return circuit, connected to the array conductors and including first and second common return lines connecting first and second ends, respectively, of the array conductors to the processing circuit, for conducting the array-conductor signals to the processing circuit, each return line including:
      i. a compensation segment extending along a digitizing-area edge associated with that return line, the compensation segment being connected to the processing circuitry; and
      ii. a connection segment extending generally anti-parallel to the compensation segment and connected to the array conductors at respective connection points, the connection segment being disposed close enough to the digitizing area that the sensitivity per unit length to probe signals of the part of the compensation segment closest to the probe is approximately half that of the part of the connection segment closest to the probe when the probe is in the digitizing area but near the associated edge thereof,
   the return circuit thereby forming with each array conductor an associated sense path including the compensation segments on the first and second common return lines and the parts of the connection segments between the associated connection points and the compensation segments; and
   E. a switching circuit, including a switch interposed in each array conductor and operable selectively to interrupt and complete the sense path associated therewith, for selectively completing the sense paths in sequence, whereby, when a single given sense path is completed, the signal strength induced in the part of the connection segment beyond the sense path is isolated from the processing circuit, and the signals induced in the connection and compensation segments of each return line thus tend to cancel each other.

2. A digitizing tablet as defined in claim 1 further including:
   A. a second set of array conductors perpendicular to those of the first-mentioned set;
   B. a second return circuit, connected to the array conductors of the second set and including third and fourth common return lines connecting first and second ends, respectively, of the second-set array conductors to the processing circuit, for conducting the array-conductor signals induced on the second-set array conductors to the processing circuit, each of the third and fourth common return lines including:

i. a compensation segment extending along a digitizing-area edge associated with that return line, the compensation segment being connected to the processing circuitry; and ii. a connection segment extending generally anti-parallel to the compensation segment and connected to the second-set array conductors at respective connection points, the connection segment being disposed close enough to the digitizing area that the sensitivity per unit length to probe signals of the part of the compensation segment closest to the probe is approximately half that of the part of the connection segment closest to the probe when the probe is in the digitizing area but near the associated edge thereof, the second return circuit thereby forming with each second-set array conductor an associated second-set sense path including the compensation segments on the third and fourth common return segments and the parts of the connection segments between the associated connection points and the compensation segments; and C. a second switching circuit, including a switch interposed in each second-set array conductor and operable selectively to interrupt and complete the sense path associated therewith, for selectively completing the second-set sense paths in sequence, whereby, when a single given second-set sense path is completed, the signal strength induced in the part of the connection segment beyond the second-set sense path is isolated from the processing circuit, and the signals induced in the connection and compensation segments of each of the third and fourth return lines thus tend to cancel each other.

3. A digitizing tablet as defined in claim 2 further including first and second extension segments connecting the compensation segments of the first and third return lines to the connection segments of the second and fourth return lines so that the connection and compensation segments of the second and fourth return lines provide the connection of the compensation segments of the first and third return lines to the processing circuitry, the first and second extension segments extending parallel to the compensation segments of the second and fourth return lines, respectively, and being so spaced from the digitizing area as to have substantially the same sensitivity to the probe signals as the compensation segments of the second and fourth return lines, respectively, whereby the signals induced in the first extension segment and in the connection and compensation segments of the second return line tend to cancel out when the probe is near the digitizing-area edge associated therewith and a sense path is completed by one of the switches in the second switching circuit, and whereby the signals induced in the second extension segment and in the connection and compensation segments of the fourth return line tend to cancel out when the probe is near the digitizing-area edge associated therewith and a sense path is completed by one of the switches in the first switching circuit.

4. A digitizing tablet as defined in claim 3 wherein the digitizing probe is a probe for generating a varying magnetic field as its probe signal and wherein the array-conductor signals are the electromotive forces induced as a result in the array conductors.

5. A digitizing tablet as defined in claim 2 wherein the digitizing probe is a probe for generating a varying magnetic field as its probe signal and wherein the array-conductor signals are the electromotive forces induced as a result in the array conductors.

6. A digitizing tablet as defined in claim 1 wherein the digitizing probe is a probe for generating a varying magnetic field as its probe signal and wherein the array-conductor signals are the electromotive forces induced as a result in the array conductors.

7. A digitizing tablet comprising:
  A. a signal source, adapted for connection to array conductors, for driving the array conductors connected thereto with source signals so as to cause them to produce array-conductor signals;
  B. a set of array conductors extending substantially parallel to each other throughout a digitizing area;
  C. a digitizing probe for sensing array-conductor signals produced by array conductors near the probe and producing probe signals in response;
  D. processing circuitry, connected to the probe to receive probe signals therefrom, for generating from the probe signals a position indication that represents the position of the digitizer probe with respect to the array conductors;
  E. a drive circuit, connected to the array conductors and including first and second common drive lines connecting first and second ends, respectively, of each array conductor to the signal source, for conducting the source signals to the array conductors, each drive line including:

i. a compensation segment extending along an edge of the digitizing area and connected to the signal source; and ii. a connection segment extending generally anti-parallel to the compensation segment and connected to the array conductors at respective connection points, the connection segment being disposed close enough to the digitizing area that the sensitivity of the probe to source signals per unit length of compensation segment is approximately half the sensitivity of the probe to source signals per unit length of connection segment when the probe is in the digitizing area but near the edge thereof along which the compensation and connection segments extend, the drive circuit thereby forming with each array conductor an associated drive path including the connection segments on the first and second common drive lines and the parts of the connection segment between the associated connection points and the compensation segments; and F. a switching circuit, including a switch interposed in each array conductor and operable selectively to interrupt and complete the drive path associated therewith, for selectively completing the drive paths in sequence, whereby, when a given single drive path is completed, the part of a connection segment beyond the drive path does not contribute to the array-conductor signal strength, and components of the probe signal caused by the connection and compensation segments of each drive line thus tend to cancel each other.

8. A digitizing tablet as defined in claim 7 further including:

A. a second set of array conductors perpendicular to those of the first-mentioned set;

B. a second drive circuit, connected to the array conductors of the second set and including third and fourth common drive lines connecting first and second ends, respectively, of the second-set array conductors to the signal source, for conducting the source signal to the second-set array conductors, each of the third and fourth common drive lines including:
  i. a compensation segment extending along a digitizing-area edge associated with that drive line, the compensation segment being connected to the signal source; and
  ii. a connection segment extending generally antiparallel to the compensation segment and connected to the array conductors at respective connection points, the connection segment being disposed close enough to the digitizing area that the sensitivity of the probe to source signals per unit length of compensation segment is approximately half the sensitivity of the probe to source signals per unit length of connection segment when the probe is in the digitizing area but near the edge thereof along which the compensation and connection segments extend, the second drive circuit thereby forming with each second-set array conductor an associated second-set drive path including the compensation segments on the third and fourth common compensation segments and the parts of the connection segments between the associated connection points and the compensation segments; and C. a second switching circuit, including a switch interposed in each second-set array conductor and operable selectively to interrupt and complete the drive path associated therewith, for selectively completing the second-set drive paths in sequence, whereby, when a given single drive path is completed, the part of a connection segment beyond that drive path does not contribute to the array-conductor signal strength, and components of the probe signal caused by the connection and compensation segments of each drive line thus tend to cancel each other.

9. A digitizing tablet as defined in claim 8 further including first and second extension segments connecting the compensation segments of the first and third drive lines to the connection segments of the second and fourth drive lines so that the connection and compensation segments of the second and fourth drive lines provide the connection of the compensation segments of the first and third drive lines to the signal source, the first and second extension segments extending parallel to the compensation segments of the second and fourth drive lines, respectively, and being so spaced from the digitizing area that the probe has the same sensitivity to signals on the first and second extension segments per unit length of extension segment as it does to signals on the compensation segments of the second and fourth drive lines, respectively, whereby the signals induced in the probe by the first extension segment and by the connection and compensation segments of the second drive line tend to cancel out when the probe is near the digitizing-area edge associated therewith and a sense path is completed by one of the switches in the second switching circuit, and whereby the signals induced in the probe by the second extension segment and by the connection and compensation segments of the fourth drive line tend to cancel out when the probe is near the digitizing-area edge associated therewith and a sense path is completed by one of the switches in the first switching circuit.

10. A digitizing tablet as defined in claim 9 wherein the signal source is a signal for driving the array conductors so as to cause them to produce array-conductor signals in the form of varying magnetic fields, and the probe signals are electromotive forces induced in the probe by the varying magnetic fields.

11. A digitizing tablet as defined in claim B wherein the signal source is a signal for driving the array conductors so as to cause them to produce array-conductor signals in the form of varying magnetic fields, and the probe signals are electromotive forces induced in the probe by the varying magnetic fields.

12. A digitizing tablet as defined in claim 7 wherein the signal source is a signal for driving the array conductors so as to cause them to produce array-conductor signals in the form of varying magnetic fields, and the probe signals are electromotive forces induced in the probe by the varying magnetic fields.

* * * * *